United States Patent
Zapf et al.

(10) Patent No.: US 8,623,462 B2
(45) Date of Patent: Jan. 7, 2014

(54) REDISPERSIBLE POLYMER POWDER COMPOSITION

(75) Inventors: Alexander Zapf, Obfelden (CH); Hans Wicki, Malters (CH); Hongli Willimann, Baar (CH); Urs Heini, Neuenkirch (CH)

(73) Assignee: Akzo Nobel N.V., Arnhem (NL)

( * ) Notice: Subject to any disclaimer, the term of this patent is extended or adjusted under 35 U.S.C. 154(b) by 150 days.

(21) Appl. No.: 13/001,164

(22) PCT Filed: Jun. 25, 2009

(86) PCT No.: PCT/EP2009/004606
§ 371 (c)(1),
(2), (4) Date: Dec. 23, 2010

(87) PCT Pub. No.: WO2009/156163
PCT Pub. Date: Dec. 30, 2009

(65) Prior Publication Data
US 2011/0104377 A1    May 5, 2011

(30) Foreign Application Priority Data

Jun. 27, 2008 (EP) .................................. 08159268

(51) Int. Cl.
*B05D 3/02* (2006.01)
(52) U.S. Cl.
USPC ..................... 427/385.5; 427/372.2; 427/384; 524/2; 524/502; 525/345
(58) Field of Classification Search
None
See application file for complete search history.

(56) References Cited

U.S. PATENT DOCUMENTS

| | | | |
|---|---|---|---|
| 1,762,494 A | 6/1930 | Wescott | |
| 3,965,281 A | 6/1976 | Takase et al. | |
| 4,546,132 A | 10/1985 | Miettunen | |
| 4,757,101 A | 7/1988 | Kleinert et al. | |
| 4,880,467 A | 11/1989 | Rirsch et al. | |
| 4,997,864 A | 3/1991 | Waters | |
| 5,132,183 A | 7/1992 | Gaidis et al. | |
| 5,145,748 A | 9/1992 | Gaidis et al. | |
| 5,293,938 A * | 3/1994 | Onan et al. ................... | 166/293 |
| 5,296,524 A | 3/1994 | Waters | |
| 5,872,189 A * | 2/1999 | Bett et al. .................... | 525/243 |
| 5,959,017 A * | 9/1999 | Eck et al. .................... | 524/425 |
| 6,559,236 B1 * | 5/2003 | Willimann et al. ........... | 525/293 |
| 7,250,468 B2 | 7/2007 | Harzschel et al. | |
| 2009/0155472 A1 | 6/2009 | Grasse et al. | |
| 2010/0081736 A1 | 4/2010 | Willimann et al. | |

FOREIGN PATENT DOCUMENTS

| | | |
|---|---|---|
| CA | 572245 | 3/1959 |
| DE | 36 06 742 | 9/1987 |
| DE | 36 06 745 | 9/1987 |
| EP | 0 165 469 | 12/1985 |
| EP | 0 403 958 | 12/1990 |
| EP | 0 635 552 | 1/1995 |
| EP | 1 081 110 | 3/2001 |
| EP | 1 451 128 | 9/2004 |
| EP | 1 466 937 A1 | 10/2004 |
| EP | 1 607 408 | 12/2005 |
| EP | 1 923 405 | 5/2008 |
| GB | 388923 | 3/1933 |
| GB | 439777 | 12/1935 |
| GB | 561491 | 5/1944 |
| JP | 2-283645 | 11/1990 |
| RU | 2 287 537 C2 | 11/2006 |
| WO | 93/14042 | 7/1993 |
| WO | 2005/100455 | 10/2005 |
| WO | 2007/054148 | 5/2007 |

OTHER PUBLICATIONS

Ichihashi, Yuichi, et al., "Partial Photooxidation of Ethylene with Water as Oxidant over Copper Oxide Supported on Silica", Journal of Catalysis, 2001, vol. 202, pp. 427-429.
Morton, Maurice, "Rubber Technology", Springer Verlag, 1995, p. 190, XP-002502389.
Van Beilen, Jan, "Alternative Sources of Natural Rubber", Outputs from the EPOBIO Project, Nov. 2006.
European Search Report, EP 08159268.5, mailed Nov. 14, 2008, 6 pages.
European Search Report, EP 08159286.7, mailed Nov. 25, 2008, 6 pages.
International Search Report and Written Opinion, PCT/EP2009/004606, mailed Oct. 6, 2009, 8 pages.
International Search Report and Written Opinion, PCT/EP2009/004607, mailed Oct. 6, 2009, 9 pages.
International Preliminary Report on Patentability, PCT/EP2009/004606, mailed Jun. 29, 2010, 11 pages.
International Preliminary Report on Patentability, PCT/EP2009/004607, mailed Jun. 30, 2010, 9 pages.

\* cited by examiner

*Primary Examiner* — Erma Cameron
(74) *Attorney, Agent, or Firm* — Robert C. Morriss

(57) ABSTRACT

The present invention pertains to a water-redispersible polymer powder composition based on at least one synthetic polymer and at least one natural latex. Preferably, the polymer powder contains up to about 90 wt. % of at least one water-insoluble, synthetic polymer, up to about 90 wt. % of least one natural latex, about 0 to 50 wt. % of at least one protective colloid, about 2 to 50 wt. % of at least one filler and/or anti-caking agent, as well as optionally further additives. In addition, the invention pertains to a process for the preparation of the polymer powder composition, the use thereof as an additive in building material compositions, as well as building material compositions containing the polymer powder composition.

20 Claims, No Drawings

REDISPERSIBLE POLYMER POWDER COMPOSITION

This application is a national stage filing under 35 U.S.C. §371 of PCT/EP2009/004606, filed Jun. 25, 2009, which claims priority to European Patent Application No. 08159268.5, filed Jun. 27, 2008, the contents of which are incorporated herein by reference in their entirety.

The invention pertains to a water-redispersible polymer powder containing at least one water-insoluble, synthetic polymer and at least one natural latex, processes for the preparation thereof, use as an additive in building material compositions, as well as building material compositions containing the water-redispersible polymer.

A major drawback to liquid, water-dispersed, synthetic or natural polymerisates lies in the fact that they cannot be mixed into a dry mortar at the factory. Thus such systems, if they contain mineral binder, must be offered to the customers as two-component products, which brings with it known drawbacks such as for instance inadequate resistance to freeze-thaw and possible mixing problems at the construction site when mixing with water.

In order to remove these drawbacks, quite some time ago water-redispersible polymer powders, also called dispersion powders or redispersion powders, were developed. For the preparation thereof in a first step synthetic aqueous dispersions are prepared, as a rule by means of emulsion or suspension polymerisation, which are typically stabilised by means of high-molecular compounds such as in particular partially saponified polyvinyl alcohol. In a subsequent step, the obtained dispersions are dried, optionally after the addition of further additives such as spraying adjuvants, while avoiding film formation, for which process often spray drying is selected.

Water-redispersible polymer powders are advantageously used in dry mortars, which often contain at least one mineral binder, often a hydraulically setting binder. Such dry mortars are formulated int. al. as tile adhesives, smoothing mortars, repair mortars, and as thermal insulation mortars. The latter have seen increased use lately, since within the framework of climate change and higher energy prices the insulation of buildings and the energy saving derived therefrom is gaining in importance.

An important property of such thermal insulation mortars is a good adhesion of the mortar to hydrophobic substrates such as for instance the frequently used expanded polystyrene sheets. It is particularly important in that case that especially after wet storage the adhesive values are still high enough. Furthermore, also a low water absorption of the mortar matrix and good water-repellant properties, also called hydrophobicity, are important criteria for this application.

Synthetic polymerisates, in many cases in the form of emulsion and/or suspension polymerisates, are frequently added to building material compositions for their modification.

There have been a few attempts to use renewable raw materials, such as for instance natural latex, also known as natural rubber latex, abbreviated as "NRL", in building material compositions instead of the synthetic polymerisates. Natural latex is often also called natural rubber, India rubber, latex from trees, gum elastic or caoutchouc. By natural latex the person skilled in the art means the white milky juice, also called latex, which is present in the latex tubes of numerous dicotyledons and which is won by making an incision in the secondary bark of rubber or para rubber trees, in which process this latex is still present as latex, that is to say, the polymer particles are dispersed in the aqueous phase. As soon as the latex is precipitated or coagulated, the product is no longer covered by the term natural latex.

DE 36 06 742 A1 discloses a process to manufacture a free-flowing powder caoutchouc filled with silicic acid, obtained by precipitating a caoutchouc latex in the presence of a specific silicic acid and a precipitating aid with the aid of acids. Upon precipitating, the latex particle loses its spherical form and integrates into larger coagulates. Therefore, such products cannot disintegrate into the primary latex particles anymore and show no signs of redispersion.

U.S. Pat. No. 4,546,132 claims a weather-resistant, high-strength concrete for structures subject to water that freezes to ice and melts again depending on ambient temperature, comprising a concrete mix including a cementing agent and rubber powder mixed in the concrete mix. The rubber powder, being natural or synthetic powder or mixtures thereof, has advantageously been ground from used automobile tires. WO 93/14042 describes a material containing powdered rubber for protecting concrete from the effects of freezing and thawing. The powdered rubber is preferably obtained from shredded car tires. When making car tires, latex particles from either natural or synthetic latex are coagulated and therefore lose their shape. Hence, rubber powders obtained from ground car tires are not capable of redispersing to the initial latex particle, but retain their shape when getting in contact with water.

WO 2007/054148 describes a building material composition, in particular a bitumen-free sealing compound, containing a polymer dispersion or a redispersion powder, polystyrene particles, ceramic hollow microspheres and synthetic hollow microspheres. As polymer dispersion, natural as well as synthetic polymers can be used, such as natural rubber and synthetic resin dispersions. As redispersion powders commercially available powders are used, which are based on synthetic water-redispersible emulsion polymers and are well known to the skilled person.

U.S. Pat. No. 4,880,467 describes uncured plaster or paste with a particle size of at most 100 micrometers, containing at least one hydraulic cement and at least one polymer latex in an amount of 1 to 20 parts by weight per 100 parts by weight of cement and 8 to 20 parts by weight of water per 100 parts by weight of cement. Hardened cementitious compositions can be prepared by heating to above 100° C. and can be used for instance as roof tiles. Instead of styrene-butadiene copolymers, the polymer latex used can for instance also be natural latex.

As indicated above, an important feature of today's state of the art polymer powders that are suitable for use in building compositions, which are based on synthetic latexes, is that they not only disintegrate to their primary particle size when mixed with water, they are also film forming when the aqueous redispersions are dried at ambient conditions. Hence, the primary particles of the latex to be dried need to be designed in such a manner that they keep their shape after they are dried, optionally with suitable adjuvants, to form what is defined as water-redispersible powders. Furthermore, the obtained powders need to be free flowing and must not cake for months even at elevated temperatures such as e.g. 40° C. However, when redispersed in water, the disintegrated primary particles when used in their final application, such as in building, need to coalesce and form a film even at or below ambient conditions when the water evaporates.

The water-redispersible polymer powders commercially available nowadays are based on water-insoluble synthetic polymers, and thus rely on petrochemistry. Because of the rising price of crude oil, the products based thereon are also becoming more expensive. Furthermore, crude oil and the products based thereon will not always be available on the scale that they are now.

The present invention therefore has for its object to provide new raw materials which are not dependent on crude oil, such as renewable raw materials, for water-redispersible polymer powders, while providing a redispersible powder that shows advantageous properties such as improved hydrophobicity and reduced water absorption, in particular in the case of the use thereof in thermal insulation mortars.

It was surprisingly found that the object can be achieved by means of a water-redispersible polymer powder containing at least one water-insoluble, synthetic polymer and at least one natural latex.

The polymer powder according to the invention was found to be free-flowing and to have good anti-caking properties. Thus it can be stored even for a prolonged time at e.g. 40° C. without caking. When in contact with water, it shows very good wettability and redispersibility, so that already on contact with water within a few seconds, often after light stirring, the mixture can be fully redispersed. This means that the polymer powder disintegrates finally to particles having the size of the latex particles before drying. Redispersion can even occur with no or low mixing with water. The redispersion of the inventive polymer powder has a high colloidal stability, thus it is very stable in high ionic liquids and pastes, including high and low pH and/or cementitious systems, and does not coagulate when mixed therein. This is particularly surprising since natural latex as such does not possess such a high colloidal stability. When a film is cast at ambient conditions, it shows a high flexibility and elasticity with elastomeric properties. In addition, the polymer powder can be used in many different ways and is very readily miscible with all sorts of dry mortar mixtures and stored. When the dry mortar is mixed with water and cured, it imparts excellent adhesion and cohesion properties and it gives the mortar a high flexibility with elastomeric properties, even over a broad temperature range. Thus, the inventive water-redispersible polymer powder prepared by simple combination of natural latex and water-insoluble, synthetic polymers not only shows all positive properties of traditional water-redispersible polymer powders, but in addition the natural latex surprisingly also produces hydrophobising properties in set building material compositions containing even modest amounts of polymer powder according to the invention. Since the synthetic polymer and the natural latex can be combined in a very broad ratio, the thermoplastic properties of the synthetic polymer can be easily combined with the elastomeric properties of the natural latex according to specifically required needs. Furthermore, the dependence on crude oil-based raw materials is reduced.

Claimed also is a process for the preparation of the polymer powder. In this process the natural latex is mixed in the aqueous phase with at least one radical initiator and/or with at least one oxidising agent and subsequently dried, with the synthetic polymer being added before, during and/or after the addition of at least one radical initiator and/or oxidising agent and/or in the form of a water-redispersible polymer powder after the drying step.

Surprisingly, it was found that the polymer powder of the present invention is particularly suitable for hydrophobising and/or reducing the water absorption of building material compositions which are mixed with water and cured. Consequently, the present invention also relates to the use of the polymer powder as an additive in building material compositions, preferably in building material compositions in powder form, and to building material compositions containing the polymer powder, in particular building material compositions in powder form.

In the process to hydrophobise cured building material compositions of the invention the polymer powder can either be worked into the building material composition and/or used for surface treatment of the building material composition. When they are worked into the building material composition, the whole building material composition is hydrophobised, even when the surface is damaged. In this case the term mass hydrophobising is used. The polymer powder according to the invention in the meaning of the invention also leads to strongly reduced water absorption of the building material composition, even when it has an alkaline or neutral pH-value.

Since the product of the invention is a redispersible powder, it is possible for it to be worked into a dry mixture already at the factory, which makes possible exact dosing and a homogeneous distribution and makes its preparation particularly easy and economical. For use this dry mixture then only has to be mixed with the appropriate amount of water and applied, which brings many advantages with it, such as for instance easy handling, simplified logistics and/or resistance to freeze-thaw.

The invention finally provides a process for hydrophobising cured building material compositions wherein the building material compositions containing the polymer powder of the invention are mixed with water, blended, applied to a substrate, and subsequently dried, in which process the drying can take place under ambient conditions and by means of chemical binding of the water and/or by removing the water by means of evaporation and/or absorption through the substrate. In that case it is of great advantage that no additional curing step and/or curing aid such as for instance a catalyst is needed. By ambient conditions are meant the conditions provided by the surroundings, without for instance additional heat, vapour and/or radiation being supplied.

In this specification water-redispersible powder stands for a powder wherein the primary particles are designed in such a manner that they keep their shape after they are dried, optionally with suitable adjuvants. This means that drying can be done while avoiding film formation.

In order to get redispersible powders that do not form a film upon drying but are capable of film formation when used in their final application, several measures known to the person skilled in the art can be taken. These known measures include but are not limited to the addition of high-molecular weight stabilising colloids during and/or after the emulsion or suspension polymerisation.

Additionally, a skilled person will know that some drying methods are more appropriate to prevent the formation of a film upon drying than others and that the conditions during drying also assist in preventing the formation of a film when drying the redispersible powder.

Another measure to prevent film formation includes ensuring that the glass transition temperature of the primary particles obtained from emulsion or suspension polymerisation is not too low, since otherwise, despite the use of added stabilising colloids, coalescence and thus film formation will occur when making the powders, which has a distinct detrimental effect on redispersion. Thus it has been shown that the glass transition temperature as a rule should not be lower than −20° C., preferably not lower than −15° C., and most preferably not lower than about −10° C., in order to obtain a polymer powder which is still readily redispersible in water, which can also be transported without any problem, and which can even be stored at +40° C.

When the aqueous, synthetic or natural polymerisate or latex has a different composition, resulting in a very low glass transition temperature, it is barely or not at all possible to prepare water-redispersible powders, and one must continue working with the liquid systems. Since the glass transition temperature of natural latex is as low as about −63° C., natural latex cannot be transformed into water-redispersible powders using the known techniques, for immediate coalescence will occur. Alternatively, if adjuvants are added to avoid coagulation, it will make film formation of the redispersion impossible.

Building material compositions are well known to the person skilled in the art and include in particular mortars, concrete, plasters, coating systems, and building adhesives. The building material compositions generally contain one or several binders. Quite especially preferred are compositions in the form of mixtures, in particular dry mortar mixtures, which are mixed with water only a short time before application. As one-component products, they can thus be easily transported and stored.

The weight ratio of the solids content of the synthetic polymer to the solids content of the natural latex in water-redispersible polymer powder in one embodiment is about 99.9:0.1 to about 0.1:99.9, preferably about 99:1 to about 1:99, in particular about 95:5 to about 20:80, and quite particularly preferably about 90:10 to about 40:60.

In a preferred embodiment, the water-redispersible polymer powder according to the invention contains up to about 90 wt. %, preferably about 5 to 80 wt. %, in particular about 10 to 70 wt. %, of at least one water-insoluble, synthetic polymer, up to about 90 wt. %, preferably about 5 to 80 wt. %, in particular about 10 to 60 wt. %, of at least one natural latex, about 2 to 50 wt. %, preferably about 3 to 30 wt. %, in particular about 5 to 20 wt. %, of at least one protective colloid, about 2 to 50 wt. %, preferably about 5 to 40 wt. %, in particular about 10 to 30 wt. %, of at least one filler and/or anti-caking agent, as well as optionally further additives, with the specifications in wt. % being based on the total weight of the polymer powder composition and in all cases adding up to 100 wt. %.

The at least one water-insoluble synthetic polymer is suitably prepared by means of emulsion, suspension, microemulsion and/or inverse emulsion polymerisation, with the preparative process in each case being well known to the person skilled in the art. It is often useful in such a case when in the preparation of these polymerisates at least one water-soluble organic polymeric protective colloid is used for stabilisation of the particles formed in the polymerisation. Alternatively, it is also possible for cationic and/or anionic colloids, which are only partially soluble or even fully insoluble in water, to be used. Such colloids, dispersions stabilised therewith, and redispersible powders obtained therefrom are described int. al. in EP 1 098 916, EP 1 109 838, EP 1 102 793, and EP 1 923 405.

The at least one water-insoluble synthetic polymer in one embodiment is based on vinyl acetate, ethylene-vinyl acetate, ethylene-vinyl acetate-vinyl versatate, ethylene-vinyl acetate-vinyl chloride, ethylene-vinyl chloride, ethylene-vinyl laurate-vinyl chloride, vinyl acetate-vinyl versatate, ethylene-vinyl acetate-(meth-)acrylate, ethylene-vinyl versatate-(meth-)acrylate vinyl acetate-vinyl versatate-(meth-)acrylate, (meth-)acrylate, styrene-acrylate and/or styrene-butadiene, with vinyl versatate being a $C_4$- to $C_{12}$-vinyl ester, and wherein the polymerisates can contain 0-50 wt. %, in particular 0-30 wt. % of further olefinically unsaturated monomers, in particular monomers with functional groups.

Monomers with functional groups can contain alkoxysilane, silanol, glycidyl, epoxy, epihalohydrin, carboxyl, amine, amide, amidine, imine, N-methylol, isocyanate, hydroxyl, thiol, ammonium, aldehyde, ketone, carbonyl, ester, acid anhydride, acetoacetonate and/or sulfonic acid groups. When monomers with carboxyl groups are used, it is advantageous as a rule when this portion is small. Alternatively, no monomers with carboxyl groups are used at all.

When in addition to the at least one water-insoluble, synthetic polymer and the natural latex, the polymer powder also contains at least one protective colloid, this may be the same as or different from the one which is optionally used for stabilisation of the synthetically prepared polymerisate particles. Thus the redispersible powder can contain at least one water-soluble organic polymeric protective colloid and/or one partially water-soluble or water-insoluble ionic colloid prepared according to for instance EP 1 098 916, EP 1 109 838, EP 1 102 793, and EP 1 923 405. In addition, it is also possible to use additionally or as sole protective colloid one or several natural or synthetic polymers which are only soluble in the alkaline pH-range, which means that at least about 50 wt. %, preferably at least about 70 wt. %, in particular about 90 wt. %, will dissolve in water with a pH-value of 10 as a 10 wt. % solution at 23° C. Non-limiting examples of these are poly(meth)acrylic acids and the copolymers thereof and/or natural resins such as for instance colophonium and/or the derivatives thereof.

Representative synthetic protective colloids which can be used according to the invention are for example one or several polyvinyl pyrrolidones and/or polyvinyl acetals with a molecular weight of 2,000 to 400,000, fully or partially saponified polyvinyl alcohols and the derivatives thereof, which can be modified for instance with amino groups, carboxylic acid groups and/or alkyl groups, with a degree of hydrolysis of preferably about 70 to 100 mol. %, in particular of about 80 to 98 mol. %, and a Floppier viscosity in 4% aqueous solution of preferably 1 to 100 mPas, in particular of about 3 to 50 mPas (measured at 20° C. in accordance with DIN 53015), as well as melamine formaldehyde sulfonates, naphthaline formaldehyde sulfonates, polymerisates of propylene oxide and/or ethylene oxide, including also the copolymerisates and block copolymerisates thereof, styrene-maleic acid and/or vinyl ether-maleic acid copolymerisates.

Furthermore, optionally also high-molecular oligomers, which can be present as non-ionic, anionic, cationic and/or amphoteric emulsifiers, may be used for stabilisation of the particles formed in the polymerisation, alone or in conjunction with other stabilising agents. Non-limiting examples are alkyl sulfonates, alkylaryl sulfonates, alkyl sulfates, sulfates of hydroxyl alkanols, alkyl and alkylaryl disulfonates, sulfonated fatty acids, sulfates and phosphates of polyethoxylated alkanols and alkyl phenols, as well as esters of sulfosuccinic acid, quaternary alkylammonium salts, quaternary alkylphosphonium salts, polyaddition products such as polyalkoxylates, for instance adducts of 5 to 50 moles of ethylene oxide and/or propylene oxide per mole of linear and/or branched $C_6$- to $C_{22}$-alkanols, alkyl phenols, higher fatty acids, higher fatty acid amines, primary and/or secondary higher alkyl amines, with the alkyl group each time preferably being a linear and/or branched $C_6$- to $C_{22}$-alkyl group.

Preferred synthetic protective colloids are partially saponified, optionally modified, polyvinyl alcohols with a degree of hydrolysis of 80 to 98 mol. % and a Höppler viscosity as 4% aqueous solution of 1 to 50 mPas and/or polyvinyl pyrrolidone.

In a further embodiment, natural and/or synthetically prepared protective colloids can be chosen from the group of biopolymers such as polysaccharides and polysaccharide ethers, for instance cellulose ethers such as hydroxyalkyl-cellulose and/or alkyl-hydroxyalkyl-cellulose, in which case the alkyl group may be the same or different and preferably is a $C_1$- to $C_6$-group, in particular a methyl, ethyl, n-propyl and/or i-propyl group, carboxymethyl cellulose, starch and starch ethers (amylose and/or amylopectin and/or the derivatives thereof), guar ethers, dextrins, agar-agar, gum arabic, carob seed grain, pectin, gum tragacanth and/or alginates. Often it is advantageous when these are soluble in cold and/or alkaline water. The polysaccharides can, but do not need to be, chemically modified, for instance with carboxymethyl, carboxyethyl, hydroxyethyl, hydroxypropyl, methyl, ethyl, propyl, sulfate, phosphate and/or long-chain alkyl groups. As synthetic polysaccharides can be used for instance anionic, non-ionic or cationic heteropolysaccharides, in particular xanthan gum, welan gum and/or diutan gum. Preferred peptides and/or proteins to be used are for instance gelatin, casein and/or soy protein.

Preferred biopolymers are dextrins, cellulose ethers, carboxymethyl cellulose, starch, starch ethers, casein, soy-protein, gelatin, as well as hydroxyalkyl-cellulose and/or alkyl-hydroxyalkyl-cellulose, in which case the alkyl group may be the same or different and preferably is a $C_1$- to $C_6$-group, in particular a methyl, ethyl, n-propyl and/or i-propyl group.

As indicated above, the powder of the invention in a preferred embodiment can contain at least one anti-caking agent and/or filler. Anti-caking agents and/or fillers, also called aggregates, generally are of an inorganic nature, with it also being possible, however, to use organic fillers. Preferred anti-caking agents and/or fillers are quartzitic and/or carbonatic sands and/or powders such as for instance quartz sand and/or limestone powder, carbonates, silicates, chalks, layered silicates, precipitated silicas, light-weight fillers such as for instance hollow microspheres of glass, polymers such as polystyrene spheres, alumosilicates, silica, aluminium-silica, calcium-silicate hydrate, silicon dioxide, aluminium-silicate, magnesium-silicate, aluminium-silicate hydrate, calcium-aluminium-silicate, calcium-silicate hydrate, aluminium-iron-magnesium-silicate, calcium-metasilicate, clays such as vermiculites and bentonite and/or vulcanic slag as well as pozzolanes such as metakaolin, latently hydraulic components, cement and/or gypsum, in which case the fillers and/or light-weight fillers can also have a natural or artificially generated colour.

Every natural latex can be used as natural latex, with the plant from which it is won not playing any real role. Thus natural latex which can be used according to the invention can be won for instance from rubber or para rubber trees (*Hevea brasiliensis*), guttapercha trees, guayule shrubs (*parthenium argentum*), koksaghys, *mimusops balata*, as well as from sow thistles (*sondchus oleraceus*) or lettuce (*lactua sativa*).

It is preferred when in natural latex at least 50 wt. % of the naturally polymerised isoprene units is present in cis-1,4- or in trans-1,4-configuration. When a mixture of at least 2 different natural latexes is used, it is advantageous when in at least one natural latex at least 50 wt. % of the isoprene units is present in cis-1,4-configuration and/or in trans-1,4-configuration.

The natural latex to be used according to the invention typically has a degree of polymerisation of about 500 to about 100,000, preferably of about 1,000 to about 50,000, with the degree of polymerisation being based on the chain length of the polymers prior to a possible crosslinking such as for instance vulcanisation.

The mean particle size of the natural latex to be used according to the invention typically is from about 0.05 µm, preferably from about 0.1 µm, to about 5.0 µm, preferably to about 3.0 µm, with it also being possible to use such latexes as have smaller and/or larger latex particles. The particle size is measured by means of light scattering and indicated as volumetric mean.

The natural latex to be used according to the invention can also be modified, for instance with the aid of emulsifiers and/or colloids. Thus anionic, non-ionic and/or cationic natural latexes can be used. Furthermore, in the preparation of the powder according to the invention use can be made of a natural latex which is free of proteins or where the protein content has been reduced, in which case the proteins have been partially or fully removed from the natural latex by known methods in advance.

A further possibility is that the natural latex is chemically modified before the preparation of the polymer powder according to the invention, which can be done by means of for instance hydrogenation, oxidation and/or epoxidation of the double bonds or part of the double bonds or by means of vulcanisation of the natural latex. In addition, it is possible for olefinically unsaturated monomers to be converted by means of radical polymerisation in the presence of the natural latex. Often it is advantageous when these reactions are only carried out to a minor degree, so that for instance not more than about 50 mol. %, preferably not more than about 30 mol. %, and in particular not more than 15 mol. % of the double bonds present by nature will be altered.

When unsaturated monomers are converted by means of radical polymerisation in the presence of natural latex, suitable monomers and monomer classes are for instance linear, cyclic or branched $C_1$- to $C_{20}$-vinyl esters, ethylene, propylene, vinyl chloride, vinylidene chloride, (meth-)acrylic acid and the linear, cyclic or branched $C_1$- to $C_{20}$-alkyl esters thereof, (meth-)acrylamide and (meth-)acrylamide with N-substituted linear, cyclic or branched $C_1$- to $C_{20}$-alkyl groups, acrylonitrile, styrene, styrene derivatives, such as alpha-methylstyrene, ortho-chlorostyrene or vinyl toluene and/or dienes, such as for instance 1,3-butadiene and isoprene. Preferred vinyl esters are linear or branched $C_1$- to $C_{12}$-vinyl esters, such as for instance vinyl acetate, vinyl stearate, vinyl formate, vinyl propionate, vinyl butyrate, vinyl pivalate, vinyl laurate, vinyl-2-ethylhexanoate, 1-methylvinyl acetate and/or $C_9$-, $C_{10}$- and/or $C_{11}$-vinyl versatate, vinyl pyrrolidone, N-vinyl formamide, N-vinyl acetamide, as well as vinyl esters of benzoic acid and p-tert-butylbenzoic acid, with vinyl acetate, vinyl laurate and/or vinyl versatate being preferred in particular. Preferred $C_1$- to $C_{12}$-alkyl groups of (meth-)acrylic acid esters and N-substituted (meth-)acrylamides are methyl, ethyl, propyl, n-butyl, i-butyl, t-butyl, hexyl, cyclohexyl, 2-ethylhexyl, lauryl, stearyl, norbornyl, polyalkylene oxide and/or polyalkylene glycol groups, in particular methyl, butyl, 2-ethylhexyl groups. Quite particularly preferred monomers are methyl methacrylate, styrene and/or styrene derivatives, in which case homo- as well as copolymerisates can be prepared.

In addition, further monomers, in particular monomers with functional groups up to about 50 wt. %, can be copolymerised. Such monomers may be the same as or different from the ones which can be contained in the synthetic polymer and are known to the skilled person.

When olefinically unsaturated monomers are polymerised in the presence of natural latex, then the weight ratio of the thus obtained synthetic polymerisate to natural latex is about 0.1:99.9 to about 10:1, preferably about 1:99 to about 2:1, in particular about 5:95 to about 1:1, and quite particularly preferably about 1:10 to about 1:2.

The polymerisation of olefinically unsaturated monomers in the presence of natural latex can be so controlled, that the monomers form own particles which are not dependent on natural latex. Often, however, it is advantageous when as a result of suitable control of the polymerisation of the olefinically unsaturated monomers, the thus modified natural latex obtains a heterogeneous morphology. In that case it is possible on the one hand to produce a kind of core-shell morphology, with the monomers being polymerised around the natural latex itself. Another possibility is to produce other morphologies known to the skilled person, such as for instance so-called raspberry, sandwich and/or half-moon structures. A further possibility is the aggregation of typically synthetically prepared particles to the natural latex by means of known methods, for instance on the basis of ionic interactions, in which case it is advantageous when these particles have a particle size smaller than or comparable to that of the natural latex itself. Such particles can be prepared both in the presence of the natural latex and/or be prepared separately and subsequently mixed with the natural latex. In yet another embodiment the natural latex is selectively altered at the surface, for instance by means of chemical modification such as vulcanisation, oxidation, cross-linking, so that likewise a heterogeneous morphology is formed.

However, it is often helpful when the natural latex is not modified too much, e.g. to such a degree that without the synthetic polymer it would no longer be film forming at ambient conditions. Thus, most often it is advantageous when the natural latex is film forming at room temperature upon water evaporation. Films obtained from unmodified and modified natural latex—in contrast to state of the art redispersible powders—show elastomeric properties. To get full benefit in certain applications it may be advantageous for the minimum film formation temperature (MFFT) of the combination of the natural latex and the synthetic polymer—and therefore typically also the MFFT of the redispersion of the powder obtained therefrom—to be below room temperature, typically at or below about 20° C., preferably at or below about 10° C. and in particular at or below about 5° C. The MFFT is determined in accordance with DIN 53787.

After being obtained, the natural latex can also be treated with ammonia. In particular for use in alkaline media it is as a rule advantageous when the polymer powder according to the invention has an ammonia content in the form of $NH_3$ and/or $NH_4^+$ of less than 1 wt. %, preferably of less than 0.1 wt. %, in particular of less than 0.01 wt. %, and quite particularly preferably of less than 0.001 wt. %, based on the dry content of the powder. Should the ammonia content in the natural latex be too high, then it can be removed at least in part by means of known methods, such as for instance through alkaline setting of the pH-value with simultaneous and/or subsequent aspiration of the ammonia.

The polymer powder preferably contains a content of volatile organic compounds (VOC-content for short) of less than about 2,000 ppm, preferably of less than about 1,000 ppm, in particular of less than about 500 ppm, based on the dry content of the powder. According to the invention, the VOCs are determined in accordance with the Directive of the European Union 2004/42/CE, which classifies as VOC each organic compound which at a standard pressure of 101.3 kPa has a boiling point of 250° C. or lower. When the VOC-content prior to drying is too high, it can be reduced using common techniques such as for instance vapour and/or vacuum distillation and/or reacting off residual monomers.

The mean particle size of the polymer powder after drying in one embodiment amounts to at least about 10 μm or more, preferably about 30 μm or more, in particular about 50 μm or more. In addition, it is often useful when the mean particle size is at most about 2 mm or less, preferably about 1 mm or less, in particular about 0.5 mm or less, and the polymer powder is easily pourable as well as block and storage stable. The particle size of the powder particles is preferably measured by means of light scattering, in which case the volumetric mean is also decisive.

The redispersible powder according to the invention can also contain further additives. Preferred are water-soluble polymers such as polyvinyl alcohol, thickening agents, polycarboxylates, polyacrylamides, softeners, preservative agents such as biocides, herbicides, algicides and/or fungicides, anti-foaming agents, anti-oxidants, preservatives, such as preservatives against oxide, heat, ozone, light, fatigue and/or hydrolysis, additives for the reduction of sedimentation and/or bleeding, surface-active compounds such as powdery and/or liquid wetting agents, anti-foaming agents and/or tensides, alkyl, hydroxyalkyl and/or alkylhydroxyalkyl polysaccharide ethers such as cellulose ethers, starch ethers and/or guar ethers, with the alkyl and hydroxyalkyl group typically being a $C_1$- to $C_4$-group, dispersing agents, further rheology control additives such as for instance casein and/or thickening agents, agents to control the hydration of minerally setting systems, in particular setting accelerators, solidification accelerators and/or setting retarders, air-entraining agents, hydrophobic agents and/or additives for reduction of the water absorption capacity, in particular based on silanes, siloxanes, silicones, metal soaps, fatty acids and/or fatty acid esters, additives for reduction of the water absorption capacity, in particular based on silanes, siloxanes, silicones, metal soaps, fatty acids and/or fatty acid esters, additives for the reduction of shrinkage and/or efflorescence such as for instance compounds based on natural resins, in particular colophonium and/or the derivatives thereof, as well as quarternary organic ammonium compounds, fibres such as cellulose fibres, additives for the entry of air voids, water retention agents, colour pigments as well as powders which have an alkaline reaction with water, in particular oxides and/or hydroxides of alkali and/or alkaline earth salts.

Quite especially preferred additives are polysaccharide ethers, hydrophobic agents, in particular silanes, silane esters, siloxanes, fatty acids and/or fatty acid esters, water retention agents as well as additives to control the rheology, hydration, shrinkage and/or the reduction of efflorescence.

The content of these additives can be very low for for instance low-molecular surface-active substances and be in the range of about 0.01 wt. % or more, in particular about 0.1 wt. % and more, based on the dry content of the polymer powder. As a rule, it is not more than about 50 wt. %, in particular not more than about 30 wt. %, based on the dry content of the polymer powder. The addition of this additive can take place before, during and/or after the drying.

The inventive polymer powder can be manufactured by mixing natural latex with the synthetic polymer and subsequently drying the thus obtained mixture, preferably while avoiding film formation. This is particularly preferred when unmodified or only slightly modified natural latex is used. The ratio of the synthetic polymer to the natural latex, based on their solids content, in this embodiment often is about 40:60 or lower, preferably about 60:40 or lower, and in particular about 70:30 or lower.

In another embodiment, the inventive polymer powder is obtained by drying the natural latex and the synthetic polymer in a separate step, followed by mixing the obtained powders. This is particularly preferred when chemically modified natural latex is used, which is obtained e.g. by mixing the natural latex with at least one radical initiator and/or with at least one oxidising agent and at least one monomer. In this embodiment, the synthetic polymer powder can be mixed with the natural latex powder in basically any ratio, although a ratio between about 99:1 and about 1 to 99 is often preferred.

In the process for the preparation of the polymer powder wherein the natural latex is mixed in the aqueous phase with at least one radical initiator and/or with at least one oxidising agent and subsequently dried, with the synthetic polymer being added before, during and/or after the addition of at least one radical initiator and/or oxidising agent and/or in the form of a water-redispersible polymer powder after the drying step, preferred radical initiators are the initiator systems known for radical polymerisation, with there being no real limitations. Thus all initiator systems known in the mentioned types of polymerisation can be used. These include thermal initiator systems, such as persulfates, for instance potassium, sodium and/or ammonium persulfate, water- and monomer-soluble azoinitiators, such as azobisisobutyronitrile, azobiscyanovaleric acid, as well as 2,2'-azobis(2-methylpropionamidine) dihydrochloride, redox-initiator systems consisting of oxidising agents, such as for instance hydrogen peroxide, t-butyl hydroperoxide, t-butyl peroxide, isopropylbenzene monohydroperoxide, cumene hydroperoxide, t-butyl peroxopivalate, dibenzoyl peroxide, bicyclohexyl peroxydicarbonate and dicetyl peroxydicarbonate, and reducing agents, such as for instance sodium, potassium, ammonium, sulfite and disulfite, sodium, potassium and zinc formaldehyde sulfoxylate, primary, secondary, and tertiary amines with a molecular weight of preferably less than 1,000, such as tetraethylene pentamine as well as ascorbic acid, with it being possible, if so desired, to use oxidising agents which can form free radicals by means of thermal decomposition as such, as well as catalytic initiator systems, such as for instance the system $H_2O_2/Fe^{+2}/H^+$. The content of initiators, based on the monomer content, preferably is between about 0.01 and 5 wt. %, in particular between about 0.1 and 3 wt. %.

Preferred oxidising agents are peroxides such as hydrogen peroxide or organic peroxides such as are also used for radical formation, such as for instance t-butyl hydroperoxide and/or peroxyacetic acid. But it is also possible to use persulfates such as for instance ammonium, sodium and/or potassium persulfate, percarbonates such as sodium and/or potassium percarbonate, borates such as for instance sodium and/or potassium borate, transition metals with high oxidation numbers such as for instance permanganates and/or dichromates, metal ions such as for instance $Ce^{+4}$, $Ag^+$, $Cu^{+2}$, anions of halogen oxo-acids such as for instance bromates, halogens such as for instance chlorine, fluorine, bromine and/or iodine, hypochlorites such as for instance sodium and/or potassium hypochlorite, and/or ozone.

The mixing of the natural latex in the aqueous phase with at least one radical initiator and/or with at least one oxidising agent is preferably carried out at temperatures of about +5° C. or higher, preferably at about +20° C. or higher, in particular at about +30° C. or higher. Depending on the reactivity of the radical initiator and/or the oxidising agent and the reaction temperature, a very short reaction time may be sufficient. For this for instance an addition shortly before the drying can suffice. However, it is often advantageous when the mixing and/or reaction time is at least about 5 minutes, preferably at least about 10 minutes, in particular at least about 15 minutes.

The amount of the radical initiator and/or the oxidising agent used depends on the radical initiator and/or the oxidising agent and also on the desired degree of modification. Thus the weight ratio of the natural rubber latex, expressed as the solids content, to the radical initiator and/or the oxidising agent, expressed as the active content thereof, is about 200:1 to about 1:1, preferably about 100:1 to about 5:1, in particular about 50:1 to about 10:1.

The solids content of the modified or unmodified natural latex does not play an essential part in carrying out the process. However, in order to have to remove as little water as possible at the subsequent drying, it is advantageous when the solids content of the natural latex is at least about 30 wt. %, preferably at least about 40 wt. %, in particular at least about 50 wt. %. Thus the solids content can also amount to about 80 wt. %, preferably to about 75 wt. %.

The mixing of the natural latex in the aqueous phase with at least one radical initiator and/or with at least one oxidising agent can take place in the presence of at least one water-soluble organic polymeric protective colloid, one partially water-soluble or water-insoluble ionic colloid and/or one alkali-soluble polymer. The water-soluble organic polymeric protective colloid, the partially water-soluble or water-insoluble ionic colloid and/or the alkali-soluble polymer can also be added after the mixing, for instance directly before the drying. When the mixing is carried out in the presence of at least one monomer, the addition of the water-soluble organic polymeric protective colloid, the partially water-soluble or water-insoluble ionic colloid and/or the alkali-soluble polymer can alternatively take place before, during and/or after the addition of the monomer and/or its reaction with the radical initiator. When monomer is added, it is advantageous when at least about 90 wt. %, preferably at least about 98 wt. %, in particular at least 99 wt. % of the monomer is polymerised before it is dried. The monomer preferably is an olefinically unsaturated monomer.

The drying to obtain the polymer powder according to the invention can take place, optionally after the addition of further water-soluble polymers and/or further additives, by means which avoid or at least minimise film formation of the modified natural latex. Preferred such means are spray drying, including pulse combustion spray drying, freeze drying, fluidised bed drying, drum drying or flash drying, in which case spray drying is particularly preferred and the spraying can take place for instance by means of a spraying wheel, one-component or multi-component nozzle. If necessary, the mixture to be dried can still be diluted with water, in order to achieve a suitable viscosity for the drying. The drying temperature in principle has no real limits. In particular because of safety-related considerations, however, it should not, as a rule, exceed about 200° C., in particular about 175° C. In order to attain sufficiently efficient drying, temperatures of the inlet air of about 110° C. or higher, in particular of about 120° C. or higher, are preferred.

The building material compositions of the present invention in one embodiment contain, based on the dry content of the building material composition, at least about 0.1 wt. %, preferably at least about 0.5 wt. %, in particular at least about 1.0 wt. %, and/or at most about 50 wt. %, preferably at most about 40 wt. %, in particular at most about 30 wt. %, of the polymer powder according to the invention.

In one preferred embodiment the building material compositions contain at least one minerally setting binder. In another preferred embodiment the building material compositions contain no or less than 5 wt. %, preferably less than 2.5 wt. %, of a minerally setting binder.

By mineral binders are meant in the meaning of the invention, binders which as a rule are in powder form and in particular consist of at least a) one hydraulically setting binder, b) one latent hydraulic binder and/or c) one non-hydraulic binder which reacts under the influence of air and water.

As hydraulically setting binders can be used cement, in particular Portland cement, for instance in accordance with EN 196 CEM I, II, III, IV, and V, high-alumina cement and/or gypsum, by which are meant in the meaning of this invention in particular calcium sulfate in the form of α- and/or β-semi-hydrate and/or anhydrite of form I, II and/or III. As latent hydraulic binders pozzolanes such as metakaolin, calcium metasilicate and/or vulcanic slag, vulcanic tuff, trass, fly ash, acid blast-furnace slag and/or silica dust can be used, which react hydraulically in combination with a calcium source such as calcium hydroxide and/or cement. As non-hydraulic binder can be used in particular lime, mostly in the form of calcium hydroxide and/or calcium oxide. Preferred above all are pure Portland cement-based construction material compounds, a mixture of Portland cement, high-alumina cement, and calcium sulfate, as well as gypsum-based building material compositions, with it being possible in each case, if so desired, to also add latent hydraulic and/or non-hydraulic binders.

The dry mortar mixtures according to the invention can be formulated for instance as coating or composite mortars, thermal insulation mortars, sealing compounds, gypsum and/or lime and/or cement plasters, repair mortars, tile grouts, ceramic tile adhesives, plywood mortars, bonding mortars, cement primers, cementitious coatings for concrete, powder paints, parquet adhesives, self-levelling floor screeds, smoothing and/or trowelling compounds. Due to the hydrophobicity and low water absorption achieved by the polymer powder according to the invention, such mortars can be used outdoors as well as indoors.

The invention is further elucidated with reference to the following examples. Unless indicated otherwise, the tests are carried out at a temperature of 23° C. and a relative humidity of 50%.

| Abbreviations used: | |
|---|---|
| MMA | methyl methacrylate |
| BA | butyl acrylate |
| MADQUAT | a 80 wt. % aqueous solution of N,N-dimethylaminoethyl-methacrylate methyl chloride |
| MAPTAC | a 50 wt. % aqueous solution of N,N-dimethylaminoethyl-methacrylamide methyl chloride |
| AA | acrylic acid |
| VAc | vinyl acetate |
| NFS | sodiumformaldehyde sulfoxylate |
| TBHP | a 70 wt. % aqueous solution of tert-butyl hydroperoxide |
| TEPA | Tetraethylene pentamine |
| NRL | natural latex (Natural Rubber Latex; supplier: Revertex). |
| PVOH | polyvinyl alcohol with a degree of hydrolysis of 88 mol. % and a Höppler viscosity as 4% aqueous aqueous solution of 4 mPas. |
| ETICS | External Thermal Insulation Composite System |
| ETAG 004 | Guideline for European Technical Approval of External Thermal Insulation Composite Systems with Rendering, European Organisation for Technical Approvals |

Preparation of Dispersions and Powders

EXAMPLE 1

Preparation of Powder P-1

To 45.9 g of a 25 wt. % aqueous PVOH solution were added at room temperature, with stirring, 198.4 g of a polyvinyl alcohol-stabilised ethylene-vinyl acetate dispersion with an ethylene content of 25% and a solids content of 56 wt. % as well as 22 g of a commercially available NRL (Revertex 888-36; solids content 68 wt. %). The obtained mixture was then mixed with 0.86 g of a 25% aqueous solution of hydrogen peroxide and heated for 60 minutes at 60° C. with stirring, which did not lead to a change in the particle size (measured with light scattering). Then the solids content was diluted with water to 25 wt. %. The resulting mixture was dried, without further additives, by means of conventional spray drying at an inlet temperature of 125° C. to a whitish, readily water-redispersible powder in good yield, in which process no fouling worth mentioning could be detected in the spray tower. The obtained powder was next mixed with 0.5 wt. % of a commercially available silica and 18 wt. % of a commercially available carbonate.

EXAMPLE 2

Preparation of Powder P-2

Example 1 was repeated, with use being made of 4.3 g of a 25% aqueous solution of hydrogen peroxide, which likewise did not lead to a change in the particle size (measured with light scattering). The result was a whitish, readily water-redispersible powder in good yield, in which process no fouling worth mentioning could be detected in the spray tower.

EXAMPLE 3

Preparation of Dispersion D-1

212 g of a cationic NRL (Revertex 1497C-65, solids content 65 wt. %), 266 g of a cationic stabilising colloid based on MADQUAT, MMA, BA, AA (23/38/38/1) prepared according to EP 1 109 838, 40 g of a 25 wt. % aqueous solution of PVOH, 20 g of a 10% aqueous solution of sodium hydroxide, and 90 g water were charged to a 2-litre polymerisation reactor with mechanical stirrer and heated to 76° C. One minute after the addition of 2.5 g TBHP the dosing of a mixture of 316 g VAc and 72 g BA took place over a period of 120 minutes. Parallel therewith the dosing of a solution of 2.5 g NFS in 250 g water took place over a period of 150 minutes. Next, the addition of 1 g TBHP as well as a solution of 0.2 g NFS in 2 g water took place. After a further 15 minutes the content was cooled to room temperature. Obtained was a white dispersion with a solids content of 59.5 wt. %, a Brookfield viscosity at 23° C. of 3,300 mPas, and a pH-value of 4.6.

EXAMPLE 4

Preparation of Powder P-3

840 g of dispersion D-1 were mixed with 160 g of a 25 wt. % solution of PVOH with stirring. Then the solids content was diluted with water to 25 wt. %. The resulting mixture was dried, without further additives, by means of conventional spray drying at an inlet temperature of 125° C. to a whitish, readily water-redispersible powder in good yield, in which process no fouling worth mentioning could be detected in the spray tower. The obtained powder was mixed with 0.5 wt. % of a commercially available silica and 18 wt. % of a commercially available carbonate.

EXAMPLE 5

Preparation of Dispersion D-2

Example 3 was repeated, with use being made of a cationic stabilising colloid based on MADQUAT, MMA, BA, AA (23/38/38/1) and 83 g of a 25 wt. % aqueous solution of PVOH. Obtained was a white dispersion with a solids content of 58.5 wt. %, a Brookfield viscosity at 23° C. of 1,350 mPas, and a pH-value of 4.60.

EXAMPLE 6

Preparation of Powder P4

Example 4 was repeated, with use being made of 843 g of dispersion D-2 and 156 g of a 25 wt. % solution of PVOH. The result, in good yield, was a whitish, readily water-redispersible powder, in which process no fouling worth mentioning could be detected in the spray tower.

EXAMPLE 7

Preparation of Dispersion D-3

In a 12-litre polymerisation reactor with mechanical agitator 4,500 g of anionic NRL (LCS Revertex, solids content 67.5 wt. %) were slowly added, with stirring, to a mixture of 700 g of water and 1,680 g of a 24 wt. % aqueous solution of PVOH, followed by adjusting the pH value with 10 wt. % aqueous sodium hydroxide solution to about 10 and adding 200 g of MMA as well as a mixture of 22.5 g of TBHP in 225 g water. The reactor temperature was adjusted to 30° C. A mixture of 8.13 g TEPA in 81.25 g water was slowly added over 45 minutes, followed by a waiting period of 15 minutes. This was repeated three times, with the last addition being dosed in over 20 minutes. A mixture of 3.25 g TBHP in 32.5 g water was added after 45, 105, 165, 210, and 235 minutes of the initial TBHP addition. 408 g of MADQUAT were added 165 minutes after the start of the first TEPA addition. After 225 minutes, 45 g of a 20 wt. % aqueous solution of SFS were added and the reaction temperature was increased to 50° C. over 75 minutes. 15 minutes after the start of the temperature increase, 30 g of a 15 wt. % aqueous solution of SFS were added over 15 minutes. After 5 minutes, 200 g of a 10 wt. % aqueous solution of sulfuric acid were added, followed by the addition over half an hour of 90 g of a 10 wt. % aqueous solution of hydrogen peroxide, which was started 10 minutes after the completion of the sulfuric acid addition. After maintaining the reaction temperature for 90 minutes at 50° C., the reactor was cooled and discharged. The result was a clean, whitish dispersion without grits with a solids content of 47 wt. %, a pH of 6.7 and a Brookfield viscosity of 1,750 mPas, measured at 23° C. and 100 rpm. The resultant dispersion shows two distinctly different glass transition temperatures Tg at −63° C. and between +30° C. and +65° C., with the inflection temperature being at +57° C.

Although MMA, which was polymerised well before MADQUAT was added, as a homopolymer has a glass transition temperature of +105° C., no indication of such a high glass transition temperature was observed. However, the fact that the range of the glass transition temperature is much lower is interpreted to mean that at least some of the MMA has reacted onto the surface of the NRL.

EXAMPLE 8

Preparation of Dispersion D-4

In a 2-litre polymerisation reactor with mechanical agitator 500 g of anionic NRL (LCS Revertex, solids content 67.5 wt. %) were slowly added, with stirring, to 200 g of water, followed by adding 100 g of MAPTAC, 50 g of MMA, and a solution of 2.0 g of TBHP in 20 g water. No stabilisers such as surfactants and/or protective colloids such as partially saponified polyvinyl alcohol were added. The reactor temperature was adjusted to 30° C. 0.5 g of a 10 wt. % aqueous solution of TBHP and 0.5 g of a 10 wt. % aqueous solution of SFS were added 50 and 90 minutes after the monomer addition. The reaction was cooled after 3 hours, followed by discharging the reactor. The result was a clean, whitish dispersion with a solids content of 48.3 wt. % and low viscosity. The resultant dispersion shows two distinctly different glass transition temperatures Tg at −63° C. and between +35° C. and +67° C., with the inflection temperature being at +57° C.

EXAMPLE 9

Colloidal Stability Test of the Obtained Dispersions D-3 and D-4

1 g of the obtained dispersions D-3 and D-4 was mixed with two drops (ca. 0.1 g) of concentrated formic acid. Both dispersions showed excellent stability and even after several hours no signs of aggregation, grit and/or coagulation. This is particularly surprising for D-4, since no stabilisers such as surfactants or protective colloids were added to the NRL at any time. However, when only a small amount (one drop or less) of even diluted formic acid was added to the initial, unmodified NRL, immediate coagulation of the NRL occurred.

EXAMPLE 10

Preparation of Powders from D-3 and D-4

840 g of dispersion D-3 and D-4, respectively, were mixed according to Table 1 with various amounts of a 25 wt. % aqueous solution of PVOH with stirring. Afterwards, the solids content was diluted with water to 25 wt. %. The resulting mixture, without further additives, was dried by means of conventional spray drying at an inlet temperature of 125° C. to a whitish, readily water-redispersible powder in good yield, in which process no fouling worth mentioning could be detected in the spray tower. The obtained powders were mixed with 0.5 wt. % of a commercially available silica and 18 wt. % of a commercially available carbonate. Since they are based on natural latex, the films obtained therefrom show typical elastomeric properties. Thus, they possess distinctly higher flexibility at low force. Furthermore, they deform reversibly over a long elongation range. Surprisingly, these properties occured not only when the stress-strain curves of the powder films were measured at 23° C., but also at −20° C. as well as at +70° C.

These powders can be mixed with any water-redispersible powder based on water-insoluble, synthetic polymers in any ratio to obtain the inventive polymer powder composition. These combinations are well compatible, free-flowing, block-resistant even at elevated temperatures, redispersible as well as film-forming at room temperature and below, but show no adverse interaction. The higher the ratio of the polymer powders based on natural latex, the more pronounced the elastomeric behaviour of the film obtained from the redispersion of the inventive compound.

TABLE 1

Formulations for the preparation of powders based on D-3 and D-4

| Exp.No. | Dispersion type | PVOH amount [a] |
|---|---|---|
| P-5a | D-3 [b] | 0 |
| P-5b | D-3 | 7.5 |
| P-5c | D-3 | 10 |
| P-5d | D-3 | 12 |
| P-6a | D-4 | 0 |
| P-6b | D-4 | 1 |
| P-6c | D-4 | 3 |
| P-6d | D-4 | 10 |

[a] The amount of added PVOH is reported as wt. % of solid PVOH relative to the sum of the solids of the dispersion and the added PVOH.
[b] The pH of the dispersion was adjusted to pH 10 before spray drying, using a 10 wt. % aqueous sodium hydroxide solution.

REFERENCE EXAMPLE 1

Powder P-7

Powder P-7 is a commercially available, water-redispersible dispersion powder based on a polyvinyl alcohol-stabilised vinyl acetate-ethylene dispersion with 25 wt. % ethylene.

REFERENCE EXAMPLE 2

Powder P-8

Powder P-8 is a commercially available, water-redispersible dispersion powder based on a polyvinyl alcohol-stabilised vinyl acetate-ethylene dispersion with 10 wt. % ethylene.

Preparation of Dry Mortar Master Batches

EXAMPLE 11

Preparation of Cement-Based Dry Mortar Master Batch TM-1

5 kg of a cement-based dry mortar master batch TM-1 were prepared, consisting of 280 parts by weight of a commercially available Portland cement CEM I 42.5, 583 parts by weight of a quartz sand (0.1-0.6 mm), 100 parts by weight of a commercially available calcium carbonate (Durcal 65), and 2 parts by weight of a commercially available cellulose ether (methylhydroxyethyl cellulose), in which process the components were mixed in a 10 l vessel with a FESTO stirrer until a homogeneous dry mortar master batch was obtained.

EXAMPLE 12

Preparation of Cement-Based Dry Mortar Master Batch TM-2

5 kg of a cement-based dry mortar master batch TM-2 were prepared, consisting of 350 parts by weight of a commercially available Portland cement CEM I 52.5, 400 parts by weight of a quartz sand (0.1-0.3 mm), 100 parts by weight of a commercially available calcium carbonate (Durcal 65), 5 parts by weight of a commercially available cellulose fibre, and 5 parts by weight of a commercially available cellulose ether (methylhydroxyethyl cellulose), in which process the components were mixed in a 10 l vessel with a FESTO stirrer until a homogeneous dry mortar master batch was obtained.

Application-Specific Testing
Preparation of the Mortar Premix:

The amounts indicated in Tables 2 to 4 (parts by weight) of the dry mixture in question were first of all mixed dry with the further pulverulent additives or the powder according to the invention. Subsequently, the respective mixtures were stirred for 60 seconds with the amount of water indicated in the Tables, based on 100 parts of dry mortar formulation, with a 60 mm propeller stirrer at a rate of 800 rpm, with the mixing water being introduced. After a maturing time of 3 minutes the mortar was briefly stirred again by hand and applied.

EXAMPLE 13

Determination of Hydrophobicity by Means of the Water Drop Method

The ready mixture was applied with the aid of spacers in a layer thickness of 5 mm on a cement fibre board, with the mortar in the lower part being drawn away without spacers to grain size (zero coating). The prepared samples were next stored for 1 day at 23° C. and 50% relative humidity. On the two mortar surfaces (5 mm and zero coating) of the respective samples 0.5 ml water each was applied with a pipette, with the time being measured until the water drops applied were fully absorbed by the mortar substrate.

TABLE 2

Determination of the hydrophobicity of the cement-based dry mortar master batch TM-1 mixed with different additives in powder form (indication in wt. %) and with 22 wt. % mixing water (on 100 wt. % dry mortar formulation)

| | Experiment No. | | |
|---|---|---|---|
| | 1.1 (Ref.) | 1.2 | 1.3 |
| TM-1 | 96% | 96% | 96% |
| powder P-7 (Ref.) | 4% | | |
| powder P-1 | | 4% | |
| powder P-2 | | | 4% |
| 5 mm-layer | 35 min. | 100 min. | >120 min. [a] |
| zero coating | 3 min. | 60 min. | 90 min. |

[a] The water drop was still visible on the mortar surface even after 2 hours.

The results in Table 2 clearly show that with the powder according to the invention a cement-based dry mortar mixture can be formulated which shows a clearly increased hydrophobicity in the applied and cured state.

EXAMPLE 14

Determination of the Water Absorption for ETICS-Mortar According to ETAG 004

The stirred mortar premix was applied to 60 mm thick EPS-boards (expanded polystyrene; 20 kg/m³; size 20×25 cm) in a thickness of 3 mm and next stored for 7 days at 23° C. and 50% relative humidity. Two days before the end of the storage 1 cm of the mortar surface and 2 cm of the adjoining side surfaces were coated with a water-impermeable coating compound (Sempafix 80/10), so that a test surface of 18×23 cm was formed (414 cm²). After storage had taken place the samples were immersed for 24 hours with the coated surfaces down in a container with pure tap water. Next, they were dried at 50° C. for 24 hours. This cycle was carried out three times in all. After these three cycles the samples were stored for a further 24 hours at 23° C. and 50% relative humidity.

The samples were weighed as follows: prior to the storage in water (G0) and after 1 hour (G1) and 24 hours (G24) of storage in water, with the samples being taken out of the water, carefully dried and immediately weighed to this end. From the averaged weights G0, G1, and G24 the water absorption can be calculated as follows:

Water absorption [kg/m$^2$] in 1 h=((G1−G0) [g]/414 [cm$^2$])×10

Water absorption [kg/m$^2$] in 24 h=((G24−G0) [g]/414 [cm$^2$])×10

TABLE 3

Determination of the water absorption of an ETICS-mortar, prepared from the dry mortar master batch TM-1 with an amount of mixing water of 22 wt. %, based on 100 wt. % dry mortar formulation

| | Test No. | |
|---|---|---|
| | 2.1 (Ref.) | 2.2 |
| TM-1 | 98% | 98% |
| powder P-7 (Ref.) | 2% | |
| powder P-1 | | 2% |
| water absorption after 1 h [kg/m$^2$] | 0.16 | 0.02 |
| water absorption after 24 h [kg/m$^2$] | 0.52 | 0.12 |

It becomes clear from Table 3 that, in spite of the low content of NRL in powder P-1 according to the invention, as a result of its addition the applied ETICS-mortar 2.2 shows a clearly reduced water absorption compared to reference mortar 2.1 containing the comparative powder P-7 without NRL.

EXAMPLE 15

Determination of the Adhesive Tensile Strength of a Tile Adhesive

To determine the adhesive tensile strengths, after a zero-coating the mortar was applied on a slab of concrete with a 6×6×6 mm serrated trowel at an angle of 60°. After a bedding time of 5 minutes vitrified tiles of 5×5 cm in size were laid in the mortar bed by hand and weighted with 2 kg for 30 seconds. The measuring of the adhesive tensile strengths (in accordance with CEN EN 1348) took place after the respective storage ("D"—dry storage: 28 days at 23° C. and 50% relative humidity; "W"—wet storage: 7 days of dry storage followed by 21 days in a water bath).

TABLE 4

Determination of the adhesive tensile strength after different storages of a tile adhesive prepared from the dry mortar master batch TM-2 with an amount of mixing water of 27 wt. %, based on 100 wt. % dry mortar formulation

| | | Test No. | | |
|---|---|---|---|---|
| | | 3.1 (Ref.) | 3.2 | 3.3 |
| TM-2 | | 97% | 97% | 97% |
| powder P-8 (Ref.) | | 3% | | |
| powder P-3 | | | 3% | |
| powder P-4 | | | | 3% |
| adhesive tensile | D [N/mm$^2$] | 1.20 | 1.09 | 1.04 |
| strength | W [N/mm$^2$] | 0.69 | 0.68 | 0.69 |
| | D/W [%] | 57.5 | 62.4 | 65.4 |

It is clear from Table 4 that the adhesive tensile strengths of samples 3.2 and 3.3 with the powders according to the invention after dry storage (D) are slightly lower than those of reference sample 3.1 and after wet storage (W) are comparable therewith. However, since the adhesive tensile strengths are lower after wet storage than after dry storage, the dry/wet strength decrease (D/W) also plays an important part. Here it is shown that the samples according to the invention have a lower percentage decrease. This means that the adhesion of the tiles on the mortar is reduced less by the wet storage, which is a clear advantage vis-à-vis the reference mortar containing a commercially available powder.

The invention claimed is:

1. A water-redispersible polymer powder composition containing at least one modified natural latex obtained by mixing and reacting natural latex with at least one radical initiator and/or with at least one oxidizing agent, wherein the natural latex and the at least one radical initiator and/or at least one oxidizing agent are mixed in an aqueous phase and subsequently drying of the obtained mixture, wherein the drying is selected from spray drying, pulse combustion spray drying, freeze drying, fluidized bed drying, drum drying and flash drying, said water-redispersible polymer powder composition further containing at least one water insoluble, synthetic polymer prepared by means of emulsion, suspension, microemulsion and/or inverse emulsion polymerization.

2. The polymer powder composition according to claim 1, wherein the weight ratio of the solids content of the synthetic polymer to the solids content of the natural latex is 99.9:0.1 to 0.1:99.9.

3. The polymer powder composition according to claim 2, wherein the composition contains
up to 90 wt. % of at least one water-insoluble, synthetic polymer
up to 90 wt. % of at least one natural latex,
about 2 to 50 wt. % of at least one protective colloid,
about 2 to 50 wt. % of at least one filler and/or anti-caking agent,
wherein the specifications in wt. % are based on the total weight of the polymer powder composition and in all cases add up to 100 wt. %.

4. The polymer powder composition according to claim 1, wherein the composition contains
up to 90 wt. % of at least one water-insoluble, synthetic polymer
up to 90 wt. % of at least one natural latex,
about 2 to 50 wt. % of at least one protective colloid,
about 2 to 50 wt. % of at least one filler and/or anti-caking agent,
wherein the specifications in wt. % are based on the total weight of the polymer powder composition and in all cases add up to 100 wt. %.

5. The polymer powder composition according to claim 4, wherein the polymer powder composition has a VOC content of less than about 2,000 ppm, based on the dry content of the powder composition.

6. A building material composition containing the polymer powder according to claim 4.

7. The building material composition according to claim 6, further containing at least one minerally setting binder.

8. The budding material composition according to claim 6, wherein the building material composition contains no or less than 5 wt. % of a minerally setting binder.

9. The polymer powder composition according to claim 1, wherein the polymer powder composition has a VOC content of less than about 2,000 ppm, based on the dry content of the powder composition.

10. The polymer powder composition according to claim 9, wherein the polymer powder further contains additives selected from the group consisting of colour pigments, cellulose ethers, cellulose fibers, dispersing agents, water-soluble polymers, thickening agents, water retention agents, starch ethers, guar ethers, wetting agents, polycarboxylates, polyacrylamides, hydrophobic agents, air-entraining agents, softeners, preservative agents, anti-foaming agents, anti-oxidants, preservatives against oxide, heat, ozone, light, fatigue and/or hydrolysis, rheology control additives, additives for the reduction of efflorescence, shrinkage, sedimentation and/or floating, setting and solidification accelerators, setting retarders and powders which have an alkaline reaction with water.

11. The polymer powder composition according to claim 1, wherein the polymer powder further contains additives selected from the group consisting of colour pigments, cellulose ethers, cellulose fibers, dispersing agents, water-soluble polymers, thickening agents, water retention agents, starch ethers, guar ethers, wetting agents, polycarboxylates, polyacrylamides, hydrophobic agents, air-entraining agents, softeners, preservative agents, anti-foaming agents, anti-oxidants, preservatives against oxide, heat, ozone, light, fatigue and/or hydrolysis, rheology control additives, additives for the reduction of efflorescence, shrinkage, sedimentation and/or floating, setting and solidification accelerators, setting retarders and powders which have an alkaline reaction with water.

12. A process for the preparation of the polymer powder composition according to claim 1, the process comprising mixing the synthetic polymer, the natural latex, and at least one radical initiator and/or oxidising agent in an aqueous phase, and subsequently drying the mixture, with the synthetic polymer being added
before, during and/or after the addition of the at least one radical initiator and/or oxidising agent to the latex,
wherein the drying is selected from spray drying, pulse combustion spray drying, freeze drying, fluidized bed drying, drum drying and flash drying.

13. The process according to claim 12, wherein the mixing is carried out in the presence of at least one water-soluble organic polymeric protective colloid, one partially water-soluble or water insoluble ionic colloid, one alkali-soluble polymer and/or at least one monomer.

14. A process for hydrophobising and/or reducing the water absorption of budding material compositions that are mixed with water and cured, the process comprising adding the polymer powder composition according to claim 1 to the budding material composition.

15. A building material composition containing the polymer powder according to claim 1.

16. The building material composition according to claim 15, further containing at least one minerally setting binder.

17. The building material composition according to claim 15, wherein the building material composition contains no or less than 5 wt. % of a minerally setting binder.

18. The building material composition according to claim 15, wherein the building material composition is a dry mortar and is formulated as a coating or composite mortar, thermal insulation mortar, sealing compound, gypsum and/or lime and/or cement plaster, repair mortar, tile grout, ceramic tile adhesive, plywood mortar, bonding mortar, cement primer, cementitious coating for concrete, powder paints, parquet adhesive, smoothing compound and/or trowelling compound.

19. A process for hydrophobising cured building material compositions, the process comprising stirring the building material composition according to claim 15 with water, mixing, applying to a substrate, and drying.

20. The process according to claim 19, wherein the drying takes place primarily under ambient conditions and by means of chemical binding of the water and/or by removing the water by means of evaporation and/or absorption through the substrate.

* * * * *